UNITED STATES PATENT OFFICE.

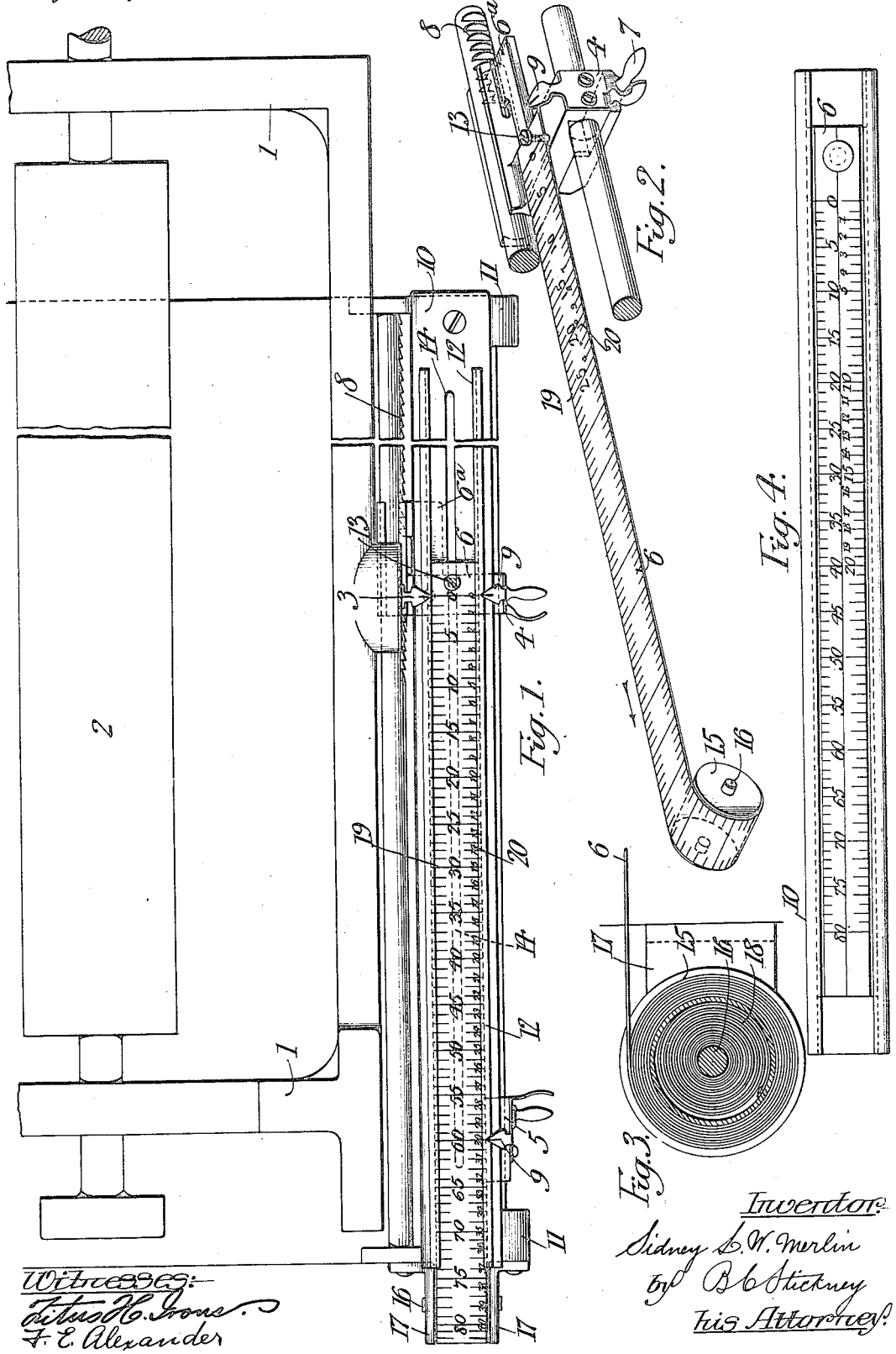

SIDNEY L. W. MERLIN, OF PARIS, FRANCE, ASSIGNOR, BY MESNE ASSIGNMENTS, TO UNDERWOOD TYPEWRITER COMPANY, OF NEW YORK, N. Y., A CORPORATION OF DELAWARE.

TYPE-WRITING MACHINE.

1,140,330.  Specification of Letters Patent.  Patented May 18, 1915.

Application filed November 26, 1912. Serial No. 733,598.

*To all whom it may concern:*

Be it known that I, SIDNEY L. W. MERLIN, a subject of the King of Great Britain, residing at Paris, France, have invented certain new and useful Improvements in Type-Writing Machines, of which the following is a specification.

This invention relates to improvements in typewriting machines, and particularly to means for instantly determining the center of a line of writing.

An object of the invention is to provide means comprising a suitably arranged scale-bearing device and pointers for use in conjunction with the adjustable margin stops on the machine, to locate mechanically and directly and without any calculating the center of any line of writing for which the margin stops may be set, whether said line is the full length permitted by the machine, or whether the stops are set for a shorter line, thereby facilitating the placing of titles, headings or the like centrally on the line of writing.

My invention is herein shown as applied to the well-known Underwood type of machine, having the usual pointer or index on the carriage, which moves between the margin stops or gages located at the front of the machine, said stops carrying pointers to indicate on a scale the distance the carriage may travel between the stops. The scale-bearing device is attached to one of the stops or gages and is thus adjustable therewith, and is provided with two series of graduations or scales at letter-space distances and both numbered away from the pointer on the stop to which the device is attached, so that the pointer of the second stop will always indicate the number of actual letter-spaces between the margin stops. The graduations of one series or scale on the device are numbered consecutively, and those of the other series or scale are numbered alternately, so that the pointer or index on the carriage indicates on one series of graduations or scale the distance of the carriage from the stop or gage to which the device is attached, and indicates on the other series or scale the number of letter spaces in half said distance. If, then, the pointer or index on the carriage is set to indicate on one series of graduations the total space to be divided at opposite ends of a head-line or the like, the other series will automatically indicate the space to be left at each end of the head-line, and therefore the position to which the carriage must be brought before the writing is commenced.

Figure 1 is a top plan view of one form of my device attached to an Underwood machine. Fig. 2 is a perspective view showing the device detached from the machine. Fig. 3 is a sectional view of the winding drum for the scale. Fig. 4 is a modification of my device.

The usual typewriter carriage 1 carrying the platen 2 in a step-by-step movement from the right toward the left, has a pointer or index 3 to indicate upon a scale-bearing device 6 the position of the carriage between the margin stops 4, 5. These margin stops 4, 5 are adjustable to regulate the distance the carriage 1 may travel, thereby lengthening or shortening the line of writing. To prevent the stops 4, 5 from being dislodged by the carriage, each stop has a detent or toothed member 6ª operated by a handle 7 to engage the teeth of a rack 8, as shown in Figs. 1 and 2, for the right margin stop only. As is usual in the Underwood machine, the left-hand gage or stop may have connecting mechanism to notify the operator of the completion of the line of writing. The pointers 9 of the margin stops extend up over a scale plate 10 on the typewriter main frame 11, to indicate their position also on the scale-bearing device 6 which runs in a guideway 12 in said scale plate. One end of the scale-bearing device is fastened to the margin stop 4 by means of a screw 13 extending through a slot 14 in the scale plate 10, into the margin stop 4, while the other end of the scale-bearing device is attached to a drum 15 pivotally mounted on a shaft 16 journaled between brackets 17 fast to the main frame 11. A spring 18 is fixed between the interior of the drum 15 and the shaft 16, and normally tends to wind the scale-bearing device 6, which is constructed of some flexible material, upon the drum whenever the margin stop 4 is moved toward the left.

The scale-bearing device 6 is provided with a main scale 19 and an auxiliary scale 20, each consisting of a series of graduations, the graduations of the scale 19 being numbered consecutively while the alternate graduations only of the other scale 20 are numbered, the numbering of both series starting at zero from the pointer or gage 9 on the margin stop 4, and both series ascending in the same direction. It will therefore be noted that wherever the margin stops 4, 5 may be set along the writing line, the pointer of the left margin stop 5 will instantly indicate upon the scale-bearing device 6 two numbers, the upper one being the number of letter-spaces between the stops or the space in the writing line, and the lower one the number of letter spaces from each stop to the center of the space between the stops, or vice versa. If, for example, the margin stops 4, 5 are set as in Fig. 1, so that the left pointer or gage 9 indicates upon the scale-bearing device 6, that there are sixty letter spaces in the writing line with thirty as the center, and it is desired to write the title "Centering scale" in the center of this line, the operation is as follows: The operator moves the carriage to the left as far as permitted by the stop 5, so that the carriage pointer or index 3 is at the sixtieth graduation, and then back spaces once for each letter and space required for the two words, that is, fifteen spaces, bringing the carriage pointer 3 to the forty-fifth upper graduation, and between the twenty-second and twenty-third lower graduations. This latter graduation indicates the number of letter spaces from each end of the line to the title, if the latter is exactly centered. The carriage is therefore returned to bring the pointer or index 3 to the twenty-second upper graduation and the words "Centering scale" written, which will then appear substantially in the center of the writing space.

If the carriage pointer or index after the back spacing indicates a graduation between two numbers upon the lower scale 20, as in the above example, the number to the right, or lowest number, is preferably used in setting the carriage.

For machines of ordinary width, a modified scale-bearing device 6b, shown in Fig. 4 may be used, the winding spool being dispensed with and the device merely sliding in its guides. For wide carriage machines, however, the tape scale-bearing device made of sufficient length will serve best, as it may be used interchangeably on any width machine within its scope.

Variations may be resorted to within the scope of the invention, and portions of the improvements may be used without others.

Having thus described my invention, I claim:

1. In a typewriter, the combination of margin stops, a carriage traveling between the limits of said stops; a scale-bearing device; pointers for said carriage and margin stops to indicate their position upon the scale, said scale-bearing device being shiftable with one of said margin stops; and guideways for said scale-bearing device upon the typewriter, to keep said scale-bearing device in position.

2. In a typewriter, the combination, with movable margin stops; of a centering device movable with one of said margin stops and provided with two scales, each consisting of a series of numbered graduations, the space between numbers on one scale being twice that between the same numbers on the other scale.

3. In a typewriter, the combination, with movable margin stops; of a centering device movable with one of said margin stops and movable independently of the other stop, said device being provided with two scales, each consisting of a series of graduations and designating characters therefor, the space between any two designated graduations on one scale being twice that between the correspondingly-designated graduations on the other scale.

4. In a typewriting machine, the combination with a scale-bearing device, of a margin stop controlling the location of the zero point of the scale with reference to the machine frame.

5. In a typewriting machine, the combination with a scale-bearing device, of a shiftable margin stop, and means connecting said scale-bearing device to said margin stop so that the zero point of the scale is always at the margin stop.

6. In a typewriter, the combination with shiftable margin stops and a carriage traveling between said stops, of a scale-bearing device connected to one of said shiftable stops and shiftable therewith, a pointer on the other stop, and a pointer on the carriage, said pointers indicating on the scale the positions of the stop and carriage.

7. The combination with a typewriter carriage, of a shiftable margin stop, a flexible scale strip attached to said stop, means to keep the said scale strip taut, and a pointer on the carriage indicating on the scale the position of the carriage.

8. In a typewriter, the combination with margin stops and a carriage traveling between said stops, of a scale-bearing device movable with one of said margin stops, a pointer on the other stop, and a pointer on the carriage, said scale-bearing device having two differently numbered series of graduations or scales.

9. In a typewriter, the combination with adjustable margin stops and a carriage traveling between said stops, of a scale-bearing device, and pointers for said carriage and margin stops to indicate their position upon the scale-bearing device, one end of said scale-bearing device being attached to one of said margin stops and shiftable therewith, said scale-bearing device being provided with two series of equally spaced graduations or scales, the graduations of one series being numbered consecutively, and the alternate graduations of the other series being numbered consecutively.

10. In a typewriter, the combination of adjustable margin stops, a carriage limited in its travel in opposite directions by said margin stops, a scale-bearing device, pointers to indicate on the scale the positions of said carriage and margin stops, and means whereby the adjustment of said stops and scale-bearing device serves to indicate the number of letter-spaces between said stops.

11. In a typewriter, the combination of adjustable margin stops, a carriage traveling between the margin stops, a scale-bearing device, pointers on said carriage and margin stops to indicate their positions upon the scale, and means operable when one of the stops is adjusted to adjust the scale-bearing device, to indicate the number of letter-spaces between said stops, and the central space between said stops.

12. The combination, with a typewriter carriage and index; of a margin gage for the beginning of the line; a main scale and an auxiliary scale both connected to said gage, each of said scales consisting of a series of numbered graduations; and an end-of-the-line gage independently adjustable along said scales, the space between numbers on the main scale being twice that between the same numbers on the auxiliary scale, to indicate the center of the line extending between said gages.

13. The combination, with a typewriter carirage and index; of a margin gage for the beginning of the line; a main scale and an auxiliary scale both connected to said gage, each of said scales consisting of a series of numbered graduations; and an end-of-the-line gage independently adjustable along said scales, the space between numbers on the main scale being twice that between the same numbers on the auxiliary scale, to indicate the center of the line extending between said gages, and the notation on said auxiliary scale ascending from the first-named gage toward the second-named gage.

14. The combination with a typewriter carriage, of a scale strip adjustable endwise, a margin gage connected to said scale strip to be adjusted therewith, and a gage or pointer independently adjustable to coöperate with said scale strip, both to determine the length of the line and also to indicate the center of lines whose beginnings and endings are determined by said gages.

15. The combination with a carriage and an index, of a carriage scale adjustable endwise, a margin gage connected to said scale for adjustment therewith, and an adjustable margin gage for the line ending.

16. The combination of a carriage, a carriage-scale adjustable endwise, a margin gage connected to said scale for adjustment therewith, and a second margin gage adjustable independently of the first.

17. The combination with a carriage and an index, of a carriage-scale adjustable endwise, a rack, and a detent or means to coöperate with said rack for positioning or justifying the scale.

18. The combination with a carriage and an index, of a carriage-scale adjustable endwise, a rack, a detent or means to coöperate with said rack for positioning or justifying the scale, and means for releasing said scale from said rack.

19. The combination with a carriage and an index, of a carriage-scale adjustable endwise, a rack, a detent or means to coöperate with said rack for positioning or justifying the scale, an index adjustable relatively to said scale, and rack-engaging means for positioning or justifying the last-mentioned index.

20. The combination with a typewriter carriage having an index, of a movable scale therefor, the range of movement of said scale from its normal position, in which it registers the full carriage movement, being in the direction of the ascending notation thereon to vary the length of the scale indicated line of writing for said carriage.

21. The combination with a typewriter carriage having an index, of a movable scale therefor, the range of movement of said scale from its normal position, in which it registers the full carriage movement, being in the direction of the ascending notation thereon to vary the length of the scale indicated line of writing for said carriage, and a gage movable with said scale.

22. The combination with a typewriter carriage having an index, of a movable scale therefor, the range of movement of said scale from its normal position, in which it registers the full carriage movement, being in the direction of the ascending notation thereon to vary the length of the scale indicated line of writing for said carriage, and a gage movable over said scale.

23. In a typewriting machine, the combination with a carriage and a margin-gage mechanism therefor, inclusive of an adjustable carriage-stop to control the left-hand margin on a work-sheet and a second adjustable stop or gage to control the right-hand margin on the work-sheet, of a scale-bearing device attached to the first-named stop and having graduations arranged to read directly the number of letter-spaces between said stops, to indicate the length of writing line bounded by said stops.

24. In a typewriting machine, the combination with a carriage and a margin-gage mechanism therefor, inclusive of an adjustable carriage-stop to control the left-hand margin on a work-sheet and a second adjustable stop or gage to control the right-hand margin on the work-sheet, of a scale-bearing device attached to the first-named stop and having graduations arranged to read directly the number of letter-spaces between said stops, to indicate the length of writing line bounded by said stops, said device also having notation arranged to indicate directly the central letter-space between said stops.

25. The combination with a typewriter carriage, a scale and index for said carriage, said scale being adjustable endwise, of an end-of-the-line gage adjustable in the direction of the run of the carriage and independently of said scale, and an auxiliary scale having notated graduations at double the intervals of those on said carriage scale and adjustable with said carriage scale.

26. The combination with a typewriter carriage, a scale and index for said carriage, said scale being adjustable endwise, of an end-of-the-line gage adjustable in the direction of the run of the carriage and independently of said scale, and an auxiliary scale having notated graduations at double the intervals of those on said carriage scale and adjustable with said carriage scale, the numbers upon the auxiliary scale running in the same direction as those upon said carriage scale.

27. The combination with a typewriter carriage, a scale and index for said carriage, said scale being adjustable endwise, of an end-of-the-line gage adjustable in the direction of the run of the carriage and independently of said scale, and an auxiliary scale having notated graduations at double the intervals of those on said carriage scale and adjustable with said carriage scale, the notation upon the auxiliary scale descending from said gage in the direction of the return movement of the carriage.

28. The combination with a carriage and an index, of an endwise adjustable scale-bearing device, and a gage to determine the beginning of a line, said gage connected to and adjustable with said device, whereby the width of the left-hand margin is controlled by the operator, and lines of all lengths begin at zero on the scale.

29. In a typewriting machine having a letter-feeding carriage, the combination with a carriage-index and an endwise adjustable scale-bearing device therefor, of margin-gage mechanism including a stop connected to said device for adjustment therewith to position said device endwise, said stop variably and mechanically limiting the carriage movement, and the scale always presenting its "0" or initial notation to said index at the beginning of lines of all lengths determined by the adjustment of said stop.

30. In a typewriting machine having a letter-feeding carriage, the combination with a carriage-index and an endwise adjustable scale-bearing device therefor, of margin-gage mechanism including a stop connected to said device for adjustment therewith to position said device endwise, the stop variably and mechanically limiting the carriage movement, and the scale always presenting its "0" or initial notation to said index at the beginning of lines of all lengths determined by the adjustment of said stop, and means adjustable with said device for mechanically indicating the center of each line whose length is determined by the adjustment of said stop.

31. In a typewriting machine having a letter-feeding carriage, the combination with a carriage-index and an endwise adjustable scale-bearing device therefor, of margin-gage mechanism including a stop connected to said device for adjustment therewith to position said device endwise, the stop variably and mechanically limiting the carriage movement, and the scale always presenting its "0" or initial notation to said index at the beginning of lines of all lengths determined by the adjustment of said stop, and means to coöperate with said index for ascertaining mechanically the initial letter-space for writing a centered heading in any length of line.

32. In a typewriting machine having a carriage and an index therefor, the combination of an endwise adjustable main carriage-scale whose zero point indicates the beginning of lines of writing of all lengths and positions, and an auxiliary scale adjustable with the main scale and having notated graduations at double the intervals of those on the main scale, whereby the movement of the carriage to a predetermined line-ending enables its index to indicate on the auxiliary scale the central letter-space of such line.

33. In a typewriter, the combination of a shiftable margin gage; a flexible scale strip attached at one end to said gage to be shifted endwise thereby; a margin gage adjustable with relation to said scale strip; and a movable element connected with the other end of said scale strip, to keep the latter taut.

34. In a typewriter, the combination of a shiftable margin gage; a flexible scale strip attached at one end to said gage to be shifted endwise thereby; a margin gage adjustable with relation to said scale strip; and automatic winding means connected with the other end of said scale strip, to keep the latter taut and wind it up when the first-named gage is shifted toward the second-named gage.

35. In a typewriter, the combination of a shiftable margin gage; a flexible scale strip attached at one end to said gage to be shifted endwise thereby; a margin gage adjustable with relation to said scale strip; and a spring drum connected with the other end of said scale strip, to keep the latter taut and wind it up when the first-named gage is shifted toward the second-named gage.

36. In a typewriter, the combination of a shiftable margin gage; a flexible scale strip attached at one end to said gage, to be shifted endwise thereby, and provided with a pair of parallel scales, each consisting of a series of numbered graduations, the space between numbers on one scale being twice that between the same numbers on the other scale; a margin gage adjustable with relation to said scale strip; and means connected with the other end of said scale strip, to keep the latter taut.

37. In a typewriter, the combination of a shiftable margin gage; a flexible scale strip attached at one end to said gage, to be shifted endwise thereby, and provided with a pair of parallel scales, each consisting of a series of numbered graduations, the space between numbers on one scale being twice that between the same numbers on the other scale; a margin gage adjustable with relation to said scale strip; and automatic winding means connected with the other end of said scale strip, to keep the latter taut and wind it up when the first-named gage is shifted toward the second-named gage.

SIDNEY L. W. MERLIN.

Witnesses:
 ALFD. J. STOCKDALE,
 MARY A. PERKINS.